US009169935B2

(12) United States Patent
Maskell

(10) Patent No.: US 9,169,935 B2
(45) Date of Patent: Oct. 27, 2015

(54) VALVES

(71) Applicant: ZODIAC POOL SYSTEMS, INC., Vista, CA (US)

(72) Inventor: Bruce W. Maskell, Moorpark, CA (US)

(73) Assignee: ZODIAC POOL SYSTEMS, INC., Vista, CA (US)

( * ) Notice: Subject to any disclaimer, the term of this patent is extended or adjusted under 35 U.S.C. 154(b) by 0 days.

(21) Appl. No.: 14/093,640

(22) Filed: Dec. 2, 2013

(65) Prior Publication Data
US 2014/0083531 A1 Mar. 27, 2014

Related U.S. Application Data

(63) Continuation-in-part of application No. 13/006,672, filed on Jan. 14, 2011, now Pat. No. 8,616,235.

(60) Provisional application No. 61/295,221, filed on Jan. 15, 2010.

(51) Int. Cl.
*F16K 15/03* (2006.01)
*F16K 15/02* (2006.01)
*F16K 27/02* (2006.01)

(52) U.S. Cl.
CPC ............ *F16K 15/025* (2013.01); *F16K 15/033* (2013.01); *F16K 27/0209* (2013.01); *Y10T 137/7898* (2015.04)

(58) Field of Classification Search
CPC . F16K 27/0209; F16K 15/033; F16K 15/025; Y10T 137/7898
USPC ............. 137/527, 527.2, 527.8, 537; 251/337
See application file for complete search history.

(56) References Cited

U.S. PATENT DOCUMENTS

| 940,182 | A | | 11/1909 | Morgan | |
|---|---|---|---|---|---|
| 2,001,941 | A | | 5/1935 | Rowe et al. | |
| 2,556,277 | A | | 6/1951 | Hill et al. | |
| 3,106,220 | A | * | 10/1963 | Hose | 137/514 |
| 3,817,278 | A | * | 6/1974 | Elliott | 137/527 |
| 4,470,429 | A | | 9/1984 | Johnson | |
| 4,595,032 | A | * | 6/1986 | Banks | 137/527 |
| 4,669,500 | A | * | 6/1987 | Strelow | 137/527 |
| 4,681,139 | A | | 7/1987 | Falconer | |
| 5,711,341 | A | | 1/1998 | Funderburk et al. | |
| 6,152,173 | A | | 11/2000 | Makowan | |
| 6,247,489 | B1 | | 6/2001 | Maskell et al. | |
| 6,314,993 | B1 | | 11/2001 | Matthews et al. | |
| 6,568,428 | B2 | | 5/2003 | Pecci et al. | |
| 7,533,691 | B2 | | 5/2009 | Marcoux et al. | |

(Continued)

OTHER PUBLICATIONS

Notice of Allowance in U.S. Appl. No. 13/006,672 dated Aug. 22, 2013.

(Continued)

*Primary Examiner* — Craig Schneider
*Assistant Examiner* — Josephine Trinidad-Borges
(74) *Attorney, Agent, or Firm* — Dean W. Russell, Esq.; Kilpatrick Townsend & Stockton LLP

(57) ABSTRACT

Valves, and particularly check valves, are detailed. The valves may isolate a spring or other biasing member from flowing fluid so as to reduce the possibility of damage to the spring caused, for example, by chemicals contained in the fluid. In some versions of the valves, the spring may be positioned within a cavity of a cover sealed from the fluid.

7 Claims, 3 Drawing Sheets

(56) References Cited

U.S. PATENT DOCUMENTS 8,616,235 B2 12/2013 Maskell
2008/0236680 A1 10/2008 Abram et al.
2011/0175010 A1 7/2011 Maskell

OTHER PUBLICATIONS

Office Action dated Feb. 25, 2013 in U.S. Appl. No. 13/006,672.
Office Action dated Nov. 15, 2012 in U.S. Appl. No. 13/006,672.

* cited by examiner

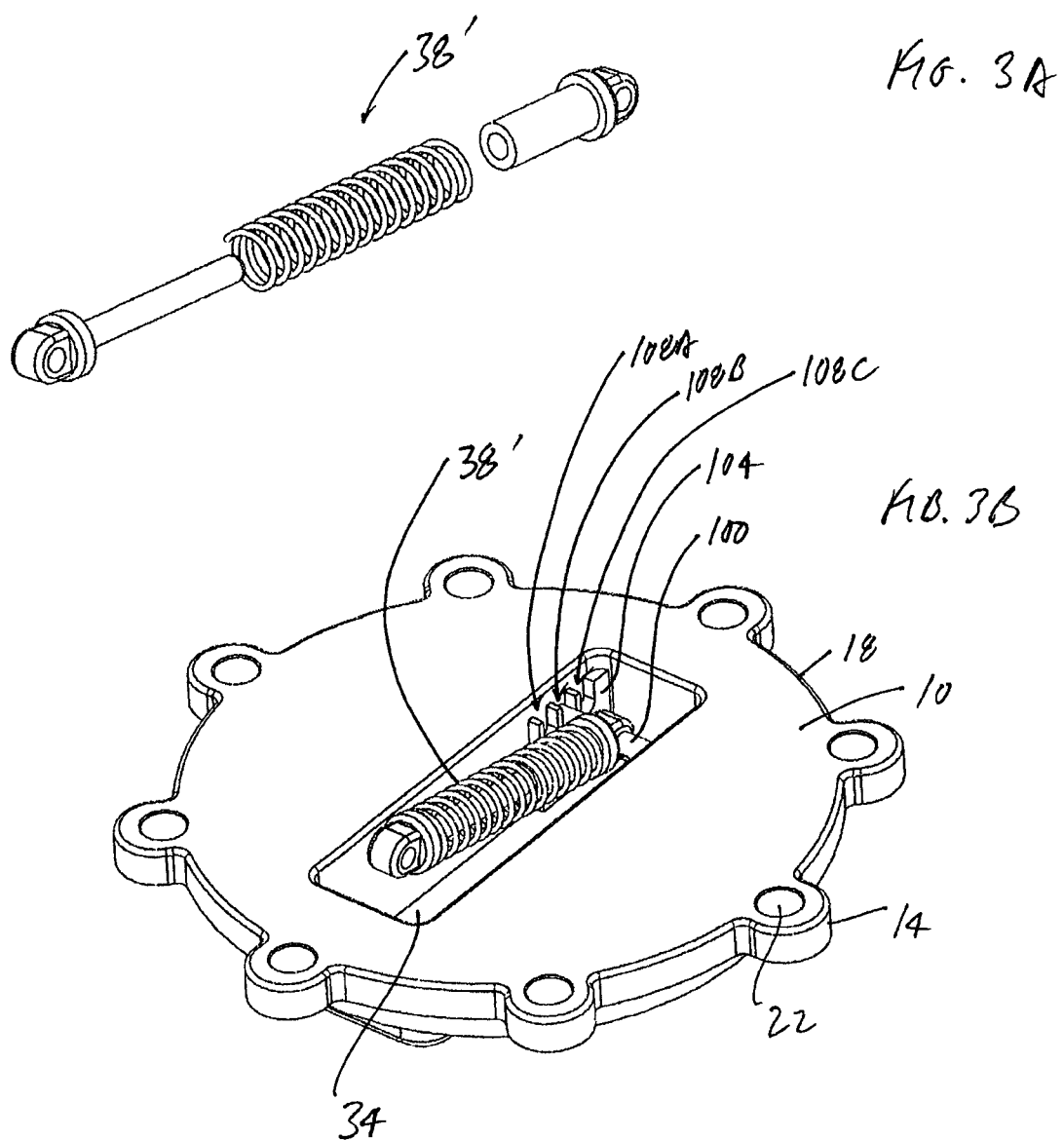

VALVES

CROSS-REFERENCE TO RELATED APPLICATIONS

This application claims the benefit of U.S. Provisional Application No. 61/295,221 filed on Jan. 15, 2010, and of allowed U.S. patent application Ser. No. 13/006,672 filed on Jan. 14, 2011, both entitled "Valves," the contents of both of which are incorporated herein by reference.

FIELD OF THE INVENTION

This invention relates to valves and more particularly, although not necessarily exclusively, to check valves designed to accommodate fluids having, e.g., low pH or high salt content.

BACKGROUND OF THE INVENTION

U.S. Pat. No. 6,247,489 to Maskell, et al., discloses an exemplary check valve especially useful as part of the water-recirculation system of a swimming pool, spa, or hot tub. The check valve includes a housing and a cover removably attached thereto. The housing may include coupling portions defining ports through which fluid may enter and exit the housing.

Pivotally attached to the cover of the check valve of the Maskell patent is a flapper assembly. The flapper assembly may comprise a diverter member having a body and two attachment arms. Pins are inserted through bores in the arms and the cover to attach the diverter member of the flapper assembly to the cover.

A spring (or other biasing member) may be positioned between the cover and the flapper assembly of the valve of the Maskell patent. The spring functions to bias the flapper assembly "into sealing engagement" with seats associated with the housing. Hence, when fluid flows through a conduit and into the entry port of the valve, it contacts the flapper assembly and pivots it to an open position . . . wherein fluid is permitted to enter the central area of the valve and exit through the [exit] port. However, should the fluid . . . be discontinued or otherwise attempt to flow out from the central area through the [entry] port, the flapper assembly is pivoted by virtue of contact with such fluid and by the biasing force of the spring [which] serves to bias [the flapper assembly] into contact with the seat to achieve a fluid-tight seal therebetween.

The contents of the Maskell patent are incorporated herein in their entirety by this reference.

SUMMARY OF THE INVENTION

The check valve of the Maskell patent is a commercially useful product. However, when subjected to certain harsh environments, the valve may become less effective or fail sooner than desired. This is a particular risk when water flowing through the valve has low pH or high salt concentration, for example, as the water may cause pitting of the (typically stainless steel) biasing spring.

Accordingly, the present invention provides a check valve in which the biasing spring (which may be adjustable) is isolated from the flowing water. The valve may include a cover having a dry cavity in which the spring is positioned and a separate covering section for the cavity. Attachment arms of a diverter member (flapper) may receive a pivot pin to which a pivot link is pinned. Water-tight seals additionally may receive the pivot pin and prevent water from entering the cavity. Further, a bail may firmly receive ends of the pivot pin to facilitate transfer of motion of the flapper into extension of the spring.

The result is an assembly in which water flow against the (closed) flapper in one direction causes it to pivot against the bail (and thus to open), in turn causing rotation of the pivot pin. Rotation of the pivot pin, in its turn, causes rotation (or other movement) of the pivot link, which extends the biasing spring. Should the water flow cease (or reverse direction), the spring will tend to contract to its normal length and the flapper will return to its closed position. Alternatively, the assembly may be configured so that the flapper is normally open and closes as a function of water flow.

It thus is an optional, non-exclusive object of the present invention to provide a valve in which a biasing member is isolated from fluid flowing through the valve.

It is another optional, non-exclusive object of the present invention to provide a valve especially useful in certain harsh environments.

It is also an optional, non-exclusive object of the present invention to provide a check valve including a flapper configured to pivot about a pin.

It is a further optional, non-exclusive object of the present invention to provide a check valve in which a spring is positioned within a cover of the valve.

It is an additional optional, non-exclusive object of the present invention to provide a check valve in which a bail, attached to a pivot pin, facilitates transfer of motion of a flapper into extension or compression of a spring.

Other objects, features, and advantages of the present invention will be apparent to those skilled in the relevant art with reference to the remaining text and the drawings of this application.

BRIEF DESCRIPTION OF THE DRAWING

FIGS. 3A-B are perspective views of portions of a second alternate version of the check valve of FIG. 1.

DETAILED DESCRIPTION

Figure 1:
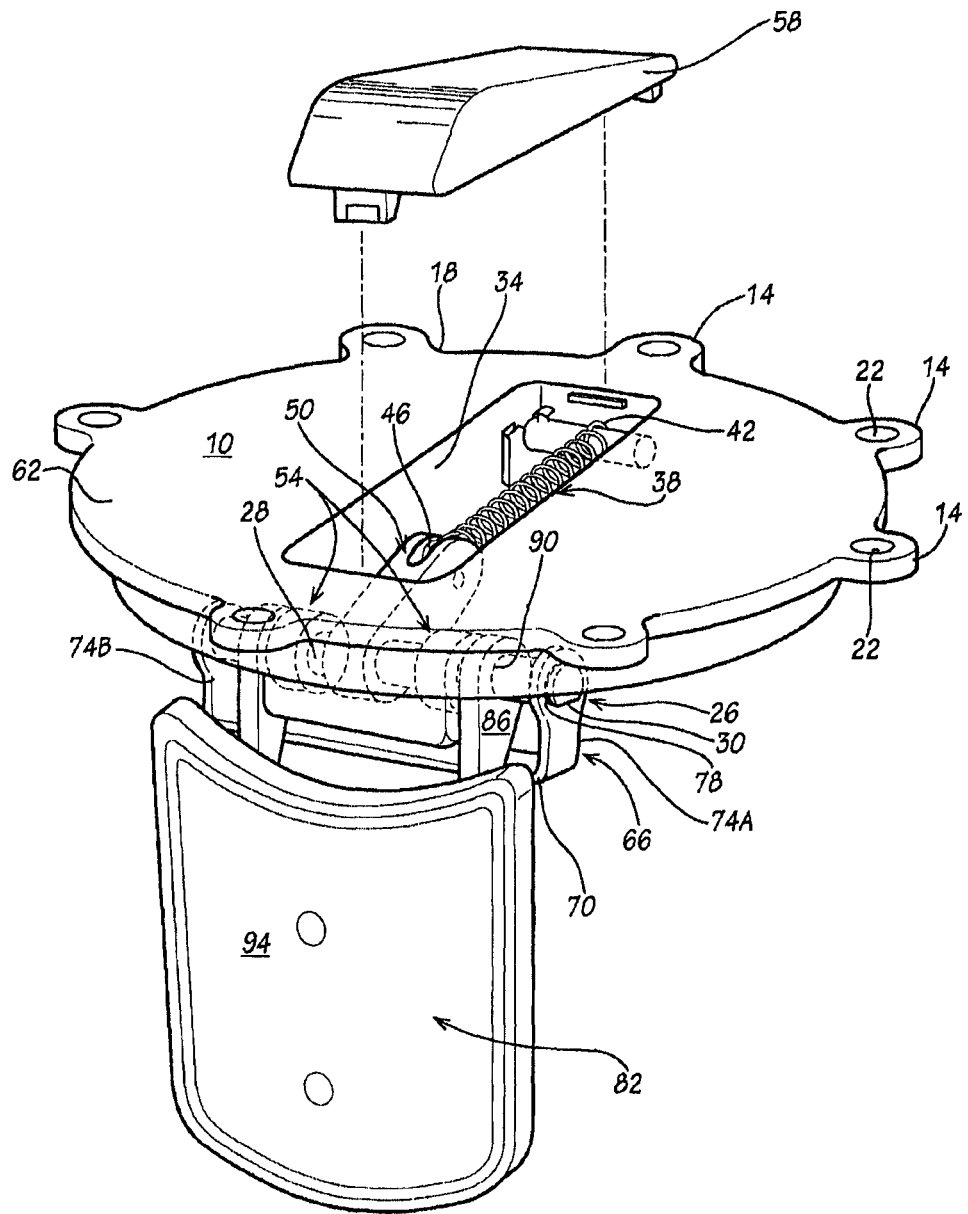
FIG. 1 is a perspective, partially-exploded view of portions of a check valve of the present invention.

Illustrated in FIG. 1 is cover 10 of an exemplary check valve of the present invention. Cover 10 may be similar to the covers described in the Maskell patent. Indeed, cover 10 may substitute for those covers if desired. In use, cover 10 is intended to be (removably) attached to a housing and, together with the housing, to form part of a valve assembly.

Cover 10 typically (although not necessarily) has generally circular cross-section with protrusions 14 extending outward about its periphery 18. Consistent with the description in the Maskell patent, each protrusion 14 contains a bore 22 for receiving a screw or other fastener to attachment to the housing of the valve.

Again similar to the valve of the Maskell patent, that of the present invention may incorporate pin-receiving bores at or adjacent periphery 18 of cover 10. Such bores receive pin 26, connecting the pin 26 to cover 10. Pin 26 preferably is cylindrical in central part 28, albeit with D-shaped ends 30. Pin 26 may, however, assume other shapes, as may its ends 30. If ends 30 indeed are D-shaped, the flat portions of the "Ds"

preferably face downward toward the housing when the valve is upright with cover 10 at its top.

Cover 10 may include cavity 34 in which (coil) spring 38 may be placed. A first end 42 of spring 38 may be anchored within cavity 34 in any suitable manner so that its second end 46 extends toward pin 26. Rather than being connected directly to pin 26 outside cover 10, however, second end 46 remains within cavity 34 and is connected to link 50. Link 50, in turn, is connected to central part 28 of pin 26 within cavity 34. Annular (or other) seals 54 receive pin 26 to either side of link 50, sealing boundaries of cavity 34 from fluid flowing through the valve.

Covering section 58 may function to cover cavity 34 to complete the isolation of spring 38 and link 50. Section 58 preferably snap-fits onto cavity 34 to provide a generally continuous upper surface 62 of cover 10. Section 58 may attach to cover 10 in other ways, however, if appropriate or desired.

Also illustrated in FIG. 1 is bail 66, preferably (although not necessarily) made of plastic or other non-metallic material. Bail 66 may comprise elongated central portion 70 from which legs 74A and 74B extend. Each leg 74A and 74B may define a D-shaped bore 78 adapted snugly to receive a corresponding D-shaped end 30 of pin 26.

Finally, depicted in FIG. 1 is flapper 82, which may if desired be similar to the diverter member of the flapper assembly of the Maskell patent. Extending from flapper 82 are one or more arms 86. In use, each arm 86 includes a bore 90 that receives pin 26—preferably between a seal 54 and a leg 74A or 74B.

Flapper 82 typically is two-sided, with first side 94 shown in FIG. 1. Fluid impinging sufficiently on first side 94 will tend to rotate flapper 82 (generally "into" the paper of FIG. 1) about pin 26 into an "open" position. This rotation itself may induce rotation of pin 26 depending on the amount of frictional contact between pin 26 and arms 86. Otherwise, flapper 82 will rotate into contact with central portion 70 of bail 66; because of the keyed connection of D-shaped bores 78 and D-shaped ends 30, such contact will cause bail 66 to induce rotation of pin 26. In either circumstance (or via a combination of the two circumstances), rotation of pin 26 will cause movement of link 50, which in turn will cause second end 46 to move away from first end 42, hence extending spring 38. Should the fluid impingement thereafter subside so as to be insufficient to overcome the contraction force of spring 38, the spring 38 indeed will contract, moving link 50 and causing pin 26 to rotate in the opposite direction, and returning flapper 82 to the "closed" position illustrated in FIG. 1. In the "closed" position, flapper 82 generally is seated (as described, for example, in the Maskell patent) so as to preclude further rotation (i.e. "out of" the paper of FIG. 1) and hence preclude any fluid impinging on the second side (not shown) of flapper 82 from exiting the valve via its entrance.

Figure 2:
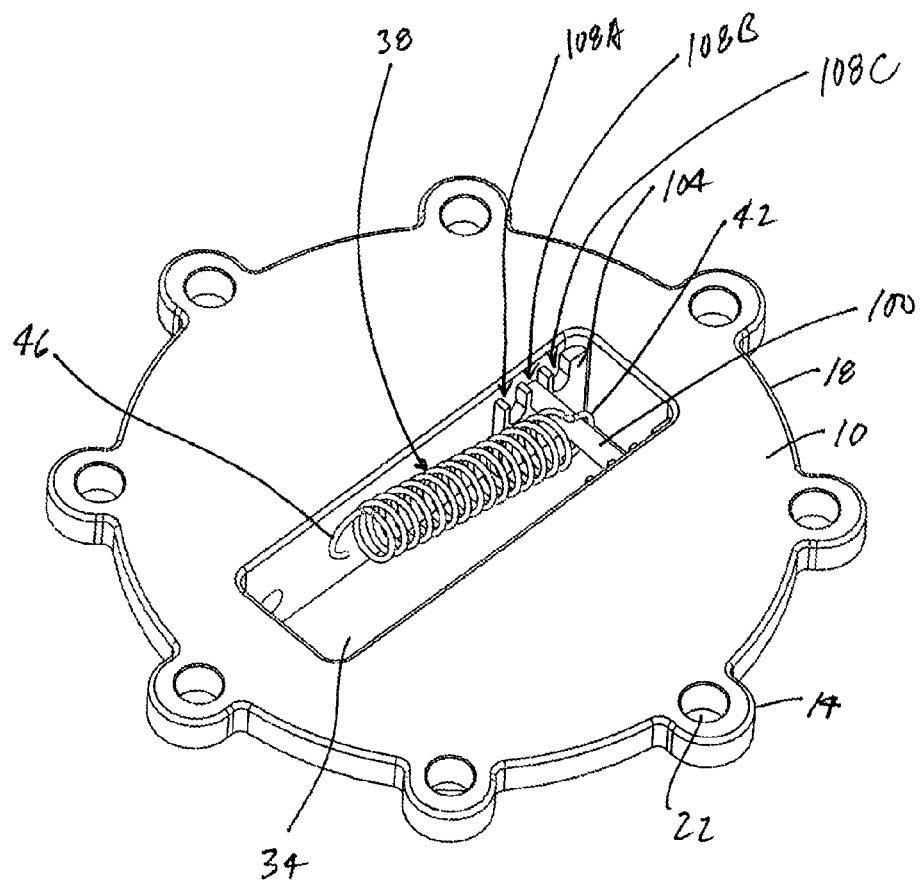
FIG. 2 is a perspective view of portions of a first alternate version of the check valve of FIG. 1.

FIG. 2 illustrates cover 10 and spring 38 as part of a first alternate version of a check valve of the present invention. Second end 46 of spring 38 may be installed as shown in FIG. 1. First end 42, however, may be moveable within cavity 34 so as to adjust the bias provided by spring 38. One such movement means is depicted in FIG. 2: As shown, first end 42 connects to anchor 100, whose position within rack 104 may be changed. Manual movement of anchor 100 between recesses 108A-C of rack 104 thus changes the normal (resting) length of spring 38, thereby changing the bias it may provide. Those skilled in the art will, of course, recognize that mechanisms other than as shown in FIG. 2 may be employed to effect changes in bias.

FIG. 3B illustrates cover 10 as well as anchor 100, rack 104, and recesses 108A-C. Spring 38' of FIGS. 3A-B is not an extension spring such as spring 38, however. Instead, spring 38' may be a compression spring. In this second alternate version of a check valve, the assembly may be reconfigured so that flapper 82 is normally open and designed to close as a consequence of sufficient fluid flow.

The assembly of the present invention thus provides a valve structure in which a biasing member, such as spring 38 or 38', is isolated from fluid flowing through the valve. Although part of presently-preferred versions of the invention, bail 66 is optional and may, in some cases, be omitted. The foregoing thus is provided for purposes of illustrating, explaining, and describing embodiments of the present invention. Modifications and adaptations to these embodiments will be apparent to those skilled in the art and may be made without departing from the scope or spirit of the invention.

What is claimed is:

1. A valve comprising:
    a. a diverter member movable between an open position facilitating fluid flow there beyond and a closed position inhibiting fluid flow there beyond;
    b. adjustable means, comprising a spring (i) indirectly connected to the diverter member and (ii) isolated from the fluid flow, for biasing the diverter member toward either the open position or the closed position;
    c. anchor (i) directly connected to the spring and (ii) configured for linear movement so as to change the effective resting length of the spring; and
    d. a bail configured to contact the diverter member at times during use.

2. A valve according to claim 1 further comprising a cover having a cavity therein and in which the adjustable means is placed inside the cavity.

3. A valve according to claim 2 in which (i) the diverter member comprises a flapper having a plurality of bores and (ii) the cover comprises a plurality of bores.

4. A valve according to claim 1 further comprising means for covering the cavity.

5. A valve comprising:
    a. a diverter member (i) movable between an open position facilitating fluid flow therebeyond and a closed position inhibiting fluid flow therebeyond and (ii) comprising a flapper having a plurality of bores;
    b. adjustable means, comprising a spring (i) indirectly connected to the diverter member and (ii) isolated from the fluid flow, for biasing the diverter member toward either the open position or the closed position;
    c. an anchor (i) directly connected to the spring and (ii) configured for linear movement so as to change the effective resting length of the spring;
    d. a cover (i) having a cavity therein and (ii) comprising a plurality of bores; and in which the adjustable means is placed inside the cavity;
    e. a pin received by the bores of (i) the flapper and (ii) the cover;
    f. a pivot link connected to (i) the coil spring and (ii) the pin;
    g. a bail configured to contact the flapper at times during use;
    h. means for covering the cavity; and
    i. a plurality of seals configured to receive the pin on opposite sides of the pivot link.

6. A valve comprising:
    a. a diverter member movable between an open position facilitating fluid flow therebeyond and a closed position inhibiting fluid flow therebeyond; and b. adjustable means, (i) indirectly connected to the diverter member and (ii) isolated from the fluid flow, for biasing the diverter member toward either the open position or the closed position, the adjustable means comprising (i) a spring having a first end, (ii) an anchor to which the first end is connected, and (iii) a rack having a plurality of recesses.

7. A valve according to claim 6 in which the anchor is configured for manual movement among the plurality of recesses so as to change the effective resting length of the spring.

\* \* \* \* \*